US008670978B2

(12) United States Patent
Nagatomo

(10) Patent No.: US 8,670,978 B2
(45) Date of Patent: Mar. 11, 2014

(54) TOPIC TRANSITION ANALYSIS SYSTEM, METHOD, AND PROGRAM

(75) Inventor: Kentaro Nagatomo, Tokyo (JP)

(73) Assignee: NEC Corporation, Tokyo (JP)

( * ) Notice: Subject to any disclaimer, the term of this patent is extended or adjusted under 35 U.S.C. 154(b) by 246 days.

(21) Appl. No.: 13/139,550

(22) PCT Filed: Dec. 14, 2009

(86) PCT No.: PCT/JP2009/070839
§ 371 (c)(1),
(2), (4) Date: Jun. 14, 2011

(87) PCT Pub. No.: WO2010/071112
PCT Pub. Date: Jun. 24, 2010

(65) Prior Publication Data
US 2011/0246183 A1    Oct. 6, 2011

(30) Foreign Application Priority Data
Dec. 15, 2008    (JP) ................................. 2008-318639

(51) Int. Cl.
*G06F 17/27* (2006.01)
*G10L 21/00* (2013.01)

(52) U.S. Cl.
USPC .............................................. 704/9; 704/270

(58) Field of Classification Search
None
See application file for complete search history.

(56) References Cited

U.S. PATENT DOCUMENTS 5,404,295 A * 4/1995 Katz et al. ..................... 715/231
5,828,839 A * 10/1998 Moncreiff .................... 709/204
6,502,065 B2 * 12/2002 Imanaka et al. ................... 704/9
6,772,120 B1 * 8/2004 Moreno et al. ............... 704/256
6,816,858 B1 * 11/2004 Coden et al. .................. 707/750
6,928,407 B2 * 8/2005 Ponceleon et al. ............ 704/253
7,137,070 B2 * 11/2006 Brown et al. ................. 715/744
7,143,428 B1 * 11/2006 Bruck et al. .................... 725/37
7,624,416 B1 * 11/2009 Vandermolen et al. ....... 725/109
7,739,261 B2 * 6/2010 Zeng et al. .................... 707/708
7,739,584 B2 * 6/2010 Vella et al. .................... 715/203
8,346,558 B2 * 1/2013 Narahara et al. ............. 704/270
2003/0061028 A1 * 3/2003 Dey et al. .......................... 704/9
2004/0024598 A1 * 2/2004 Srivastava et al. ............ 704/235
2006/0252547 A1 * 11/2006 Mizrahi et al. .................. 463/42

(Continued)

FOREIGN PATENT DOCUMENTS

JP    2000235585 A    8/2000
JP    2001306579 A    11/2001

OTHER PUBLICATIONS

International Search Report for PCT/JP2009/070839 mailed Mar. 16, 2010.

(Continued)

*Primary Examiner* — Brian Albertalli
(74) *Attorney, Agent, or Firm* — Sughrue Mion, PLLC

(57) ABSTRACT

The present invention provides a topic transition analysis system that determines a position on a primary media stream leading to a certain statement made in a language communication carried out in a secondary channel associated with the primary media stream. The topic transition analysis system includes a statement trigger string determination unit receiving a primary media stream and one or a plurality of language communication streams (hereinafter, language streams) executed in parallel with the media stream and determining whether or not a certain statement on the one or plurality of language streams has been made newly in response to contents of the media stream.

17 Claims, 8 Drawing Sheets

(56) References Cited

U.S. PATENT DOCUMENTS

| | | | | |
|---|---|---|---|---|
| 2007/0239447 | A1* | 10/2007 | Yamasaki et al. | 704/235 |
| 2008/0300872 | A1* | 12/2008 | Basu et al. | 704/235 |
| 2009/0125534 | A1* | 5/2009 | Morton et al. | 707/100 |
| 2009/0132252 | A1* | 5/2009 | Malioutov et al. | 704/258 |
| 2009/0164572 | A1* | 6/2009 | Charlton et al. | 709/204 |
| 2009/0292526 | A1* | 11/2009 | Harari et al. | 704/9 |

OTHER PUBLICATIONS

Y. Ayatsuka et al., "Challenges for Conference Augmentation Systems in WISS", Computer Software, Japan Society for Software Science and Technology, vol. 23, No. 4, Oct. 2006, pp. 76-81.

"Live Board", internet, http://ja.wikipedia.org/wiki/liveboard, free encyclopedia Wikipedia, Retrieved Aug. 15, 2008.

"Nico Nico Douga", internet, http://ja.wikipedia.org/wiki/niconicodouga, free encyclopedia Wikipedia, Retrieved Sep. 29, 2008.

H. Miyamori et al., "View Generation of TV Content using TV Viewer's Viewpoint based on Live Chat on the web", DBSJ (Database Society of Japan) Letters, vol. 4, No. 1, 2005, pp. 1-4.

K. Bessho et al., "Meeting Speech Indexing System Based on Topic Structure Extraction", IEICE (Institute of Electronics, Information and Communication Engineers) Journal D, vol. J91-D, No. 9, 2008, pp. 2256-2267.

G. Salton et al., "A Vector Space Model for Automatic Indexing", Communications of the ACM, vol. 18, No. 11, Nov. 1975, pp. 613-620.

NEC, "Speech Recognition Software CSVIEW/VisualVoice", internet, http://www.nec.co.jp/middle/VisualVoice/, Retrieved Sep. 19, 2008.

R. Rosenfeld, "A Maximum Entropy Approach to Adaptive Statistical Language Modeling", Computer, Speech and Language 10, May 21, 1996, pp. 1-37.

R. Kuhn et al., "A Cache-Based Natural Language Model for Speech Recognition", IEEE Transactions Pattern Analysis and Machine intelligence, vol. 12, No. 6, Jun. 1990, pp. 570-583.

F. Wessel et al., "Confidence Measures for Large Vocabulary Continuous Speech Recognition", IEEE Transactions on Speech and Audio Processing, vol. 9, No. 3, Mar. 2001, pp. 288-298.

R. Isotani et al., "Spontaneous Speech Recognition Technology and its Applications", NEC Technical Journal, vol. 58, No. 5, 2005, pp. 30-32.

I. Kondo et al., "Automatic generation of scene profile based on bulletin board communication synchronized with video scene and its applicability to scene navigation", ITE Technical Report, vol. 30, No. 46, Sep. 15, 2006, pp. 5-10.

H. Miyamori et al., "Method of Automatically Extracting Metadata of TV Programs Using its Live Chat on the Web", Transactions of Information Processing Society of Japan, vol. 30, No. 46, Dec. 15, 2005, pp. 59-71.

T. Daikoku et al., "Implementing and Experimental Results of Automatic Metadata-Generating System for TV-Programs Using Internet Chat System", Information Processing Society of Japan Technical Report, vol. 2005, No. 23, Mar. 11, 2005, pp. 73-78.

* cited by examiner

TOPIC TRANSITION ANALYSIS SYSTEM, METHOD, AND PROGRAM

REFERENCE TO RELATED APPLICATION

The present invention is the National Phase of PCT/JP2009/070839, filed Dec. 14, 2009, which is based upon and claims the benefit of the priority of Japanese patent application No. 2008-318639, filed on Dec. 15, 2008, the disclosure of which is incorporated herein in its entirety by reference thereto.

TECHNICAL FIELD

The present invention relates to a topic transition analysis system, method, and computer program. In particular, the present invention relates to a topic transition analysis system, method, and program that analyze topic transition in various language streams carried out in parallel with a media stream.

BACKGROUND

Since speech is transmitted via the air, not many speech channels are simultaneously available in one situation. For example, normally, only one speech channel is publicly acceptable in a meeting or a lecture, and any other speech communication using a channel besides this speech channel is referred to as "idle conversation" and is often deemed to be inappropriate.

If a meeting or a lecture is deemed to have a role in transmission of information, since such "idle conversation" is a "noise" for the only one speech channel, the idle conversation needs to be avoided. However, if a meeting or a lecture is deemed to be an opportunity to recall ideas to inspire participants or audience to obtain new ideas or viewpoints, such "idle conversation" could also be a valuable opportunity to recall ideas. Therefore, idle conversations must not always be dismissed. For example, at a question-and-answer session in an academic conference presentation, a heated discussion is often carried out on a topic slightly off the main contents of the presentation. There are communities operating based on these concepts. These communities actively adopt such communication in which a non-speech channel such as chatting is used in parallel with a speech communication. Examples of such communication include WISS (Workshop on Interactive Systems and Software) disclosed in Non-Patent Document 1.

In other fields besides a meeting, communication using a video as a medium is carried out. Even prior to spread of the Internet, such communication in which close friends away from each other talk on the phone while watching the same program on TV had often been carried out. In the earliest days of personal-computer communication or the Internet, communication through chatting is started. In this communication, heated discussions about a television program as a medium were also seen. These days, for example, dedicated threads are posted on major bulletin boards (Non-Patent Document 2), which is a quite common communication means on the Internet. Further, in recent years, since videos are available on networks, application examples that are free of temporal restrictions of television programs or radio programs are being developed (Non-Patent Document 3).

In the communication using a combination of a video and chatting, the video is used as an exclusive channel and chatting as a secondary channel. Thus, it is clear that this communication has the same configuration as that of the above communication at a meeting/lecture.

In recent years, a model including: a media stream using a speech or a video available through a primary channel; and one or a plurality of communication streams available through a secondary channel associated with the primary channel in parallel is becoming widespread in various scenes.

One of the problems with this communication model is that, when a user is too focused on the communication in the secondary stream, the user may fail to watch or hear part of the primary media stream. In this case, it would be convenient if the user could easily rewind the primary media stream to where the user started to be too focused on the secondary stream.

For example, a situation where a plurality of users are enjoying chatting while viewing video contents "prime minister's resignation announcement" will be hereinafter considered. In this situation, if the prime minister uses an abusive language, the users may break into heated discussions on abusive languages and continuously post messages listing abusive languages made by the past prime ministers and politicians. In this case, since the users are continuously posting messages on a topic (past politicians' abusive languages) somewhat off the topic, which is "the current prime minister's abusive language" in the original contents "prime minister's resignation announcement," attention of the participants of the chatting is temporarily distracted from "the prime minister's resignation announcement." After enjoying the heated discussions through chatting for a while, when the users pay attention to "the prime minister's resignation announcement" again, the users notice that the topic has become completely different. To continuously view the contents, the users need to read and understand what the current topic is. If there were a system for easily rewinding the contents to a scene immediately after the scene of "the prime minister's abusive language," which led to the series of discussions through chatting, the users could quickly view what they missed and catch up with the topic more easily. With such system, the users could efficiently browse the entire "prime minister's resignation announcement" without missing anything and could also enjoy chatting fully.

In the communication model assumed herein, the communication in the secondary channel always originates from the communication in the primary channel. In the above example, the series of discussions about the past politicians' abusive languages through chatting originates from the scene of "the prime minister's abusive language" in the video of "the prime minister's resignation announcement." Thus, if a technique that uses the communication in the secondary channel and identifies a single media stream point in the primary channel that led to the series of discussions is used, the need can be met.

Examples of an existing technique that can be used for such purpose include a speech indexing technique.

Non-Patent Document 4 is an example of the indexing technique handling speech and a secondary channel associated with the speech. The system disclosed in this document uses a television program and text of live chatting about the program. The system executes indexing as follows. Namely, first, the system measures the number of messages posted through chatting per unit time. If the number of messages is particularly large at a certain time, the system regards that an event on the television program side has caused a large response immediately before the time. Next, the system analyzes these messages by referring to the vocabulary and the like appearing in the messages. In this way, the system extracts "the degree of excitement" and "the degree of disappointment." Thus, by extracting the times at which events occur on the program side and the messages posed through chatting corresponding to the events, the system can associate certain times in the program with the individual messages posted through chatting. Namely, the system can execute indexing on a certain television program portion corresponding to a certain chat message.

Patent Document 1 is another example of the speech indexing technique. The cross-indexing system of text and speech disclosed in this document roughly operates as follows. First, the system allocates a topic label to the entire or part of text. Next, the system calculates the probability that a previously given keyword appears in each of the topics of all or part of inputted text. Finally, a speech recognition means estimates the likelihood that the keyword appears in an arbitrary section of inputted speech. By combining this likelihood with the probability that the keyword appears in each of the topics, the system estimates correlation between the text and the speech.

While Non-Patent Document 5 adopts a slightly different system, Non-Patent Document 5 is another example of a speech indexing technique based on a speech summarization technique. Based on the meeting indexing system disclosed in this document, a speech recognition technique is used to convert speech made in a meeting into text. The system uses a concept vector previously given to each term and determines whether a collection of concept vectors formed by a collection of terms included in text obtained as a result of speech recognition executed on the speech is similar to that of another speech. The system uses the results as a reference to divide the terms according to topic. Thereafter, based on the similarity among topics, the system re-establishes the topic transition in the entire meeting in the form of a tree. Each node of the tree represents a collection of speeches that belongs to a group of topics. Thus, by using this tree-shaped topic network, the system can indicate the first speech whose topic is identical to that of a certain speech in a meeting.

The technique of Non-Patent Document 5 is mainly used for speech summarization. Since a topic transition tree obtained by analyzing speeches is outputted, it is only possible to provide a link among the texts that appear in the topic transition tree, that is, from one part of speech data to another part of the speech data. However, the topic transition tree is established based on a text string obtained by a speech recognition process and the number of streams leading to a text string may be plural. Thus, by simultaneously inputting both a primary media stream and a secondary language communication channel, the technique can be extended to cross-indexing between the language communication carried out in the secondary channel and the primary media stream.

Non-Patent Documents 6 to 11 are documents introducing techniques and the like applicable to the present invention. Contents of the documents and relations of the documents to the present invention will be described at relevant portions of the exemplary embodiments.

Non-Patent Document 1:

"System for supporting a meeting organized by participants: WISS Challenge," computer software (Japan Society for Software Science and Technology), 2006, Vol. 23, No. 4, pp. 76-81

Non-Patent Document 2:

"Live Board," http://ja.wikipedia.org/wiki/liveboard, free encyclopedia Wikipedia Non-Patent Document 3:

"Nico Nico Douga," http://ja.wikipedia.org/wiki/niconicodouga, free encyclopedia Wikipedia Non-Patent Document 4:

Miyamori, et al., "View Generation of TV Content using TV Viewer's Viewpoint based on Live Chat on the Web," DBSJ (Database Society of Japan) Letters, Vol. 4, No. 1, pp. 1-4, 2005

Non-Patent Document 5:

Bessho, et al., "Meeting Speech Indexing System Based on Topic Structure Extraction," IEICE (Institute of Electronics, Information and Communication Engineers) journal D Vol. J91-D No. 9 pp. 2256-2267, 2008

Non-Patent Document 6:

Salton, et al. (1975), "A Vector Space Model for Automatic Indexing," Communications of the ACM, vol. 18, nr. 11, pp. 613-620

Non-Patent Document 7:

NEC, "Speech Recognition Software CSVIEW/VisualVoice," http://www.nec.co.jp/middle/VisualVoice/, as of 2008 Sep. 19

Non-Patent Document 8:

Rosenfeld, "A maximum entropy approach to adaptive statistical language modeling," Computer, Speech and Language 10, pp. 1-37, 1996

Non-Patent Document 9:

Kuhn and de Mori, "A cache-based natural language model for speech recognition," IEEE Transaction PAMI, Vol. 12, No. 6 pp. 570-583, 1990

Non-Patent Document 10:

Wessel, et al., "Confidence measures for large vocabulary continuous speech Recognition," IEEE Transaction on Speech and Audio Processing, 2001, vol. 9, No. 3 pp. 288-298

Non-Patent Document 11:

Isotani, et al., "Spontaneous Speech Recognition Technology and Its Applications," NEC Technical Journal Vol. 58 No. 5/2005, pp. 30-32

Patent Document 1:

Japanese Patent Kokai Publication No. JP2000-235585A

SUMMARY

The entire disclosures of the above Patent Document and Non-Patent Documents are incorporated herein by reference thereto. The following analyses are given by the present invention. The first problem is that no appropriate method is known for identifying in real time a primary media stream position causing a series of language communications leading to a certain statement on the secondary channel when language communication is carried out about a topic of the contents of the primary media stream in the secondary channel associated with the primary media stream.

For example, according to the technique disclosed in Non-Patent Document 4, time information about a statement in the secondary channel is used, and the time information is associated with part of the primary media stream temporally close to the statement. However, in this way, if the language communication in the secondary channel shifts from the original topic in the primary media stream, appropriate association cannot be carried out.

In addition, the system disclosed in Patent Document 1 requires a step of allocating a topic label to the text in advance and a step of calculating a keyword included in a topic and the probability of appearance of the keyword in advance. Thus, practically, it is difficult to apply the system to indexing of language communication that progresses in real time.

In addition, to appropriately configure a topic transition, even if the technique disclosed in Non-Patent Document 5 is applied and the primary media stream and a language stream in the secondary channel are integrated, all data in both the primary and secondary streams needs to be analyzed. It is difficult to use such technique for a media stream (a meeting, for example) that progresses in real time.

It is an object of the present invention to provide a topic transition analysis system that determines a position on a primary media stream leading to a certain statement made in a language communication carried out in a secondary channel associated with the primary media stream. In particular, it is an object of the present invention to provide an efficient topic transition analysis system that operates suitably for real-time processing.

According to a first aspect of the present invention, there is provided a topic transition analysis system comprising a statement trigger string determination unit receiving a primary media stream and one or a plurality of language communication streams (hereinafter, language streams) executed in parallel with the media stream and determining whether or not a certain statement on the one or plurality of language streams has been made newly in response to contents of the media stream.

According to a second aspect of the present invention, there is provided a topic transition analysis method comprising: selecting an arbitrary statement from one or a plurality of language communication streams executed in parallel with the media stream; and determining whether or not the statement has been made newly in response to contents of a media stream.

According to a third aspect of the present invention, there is provided a computer program causing a computer configuring a topic transition analysis system to execute the processes of: selecting an arbitrary statement from one or a plurality of language communication streams executed in parallel with a media stream; and determining whether or not the statement has been made newly in response to contents of the media stream. After stored in an arbitrary storage medium, this computer program can be distributed. Alternatively, the computer program can be distributed via a network.

The meritorious effects of the present invention are summarized as follows. According to the present invention, even if a series of language communications on a secondary channel originating from a topic at a certain point on a primary media stream gradually shifts from the original topic in terms of time or contents, the certain point on the media stream that led to the series of language communications can be determined based on an arbitrary statement on the language stream. Further, the present invention can be suitably implemented for real-time processing.

This is because that the present invention includes a statement trigger string determination unit that determines whether a certain statement on any language stream has been made newly in response to media stream contents at or near the time of creation of the certain statement or has been made continuously in response to contents of a series of statements made immediately before the certain statement. Namely, by tracking each statement appearing on the language stream, a single point or a single section on the primary media stream that has led to the series of statements can be estimated.

PREFERRED MODES

Next, exemplary embodiments of the present invention will be described in detail with reference to the drawings.

First Exemplary Embodiment

Figure 1:
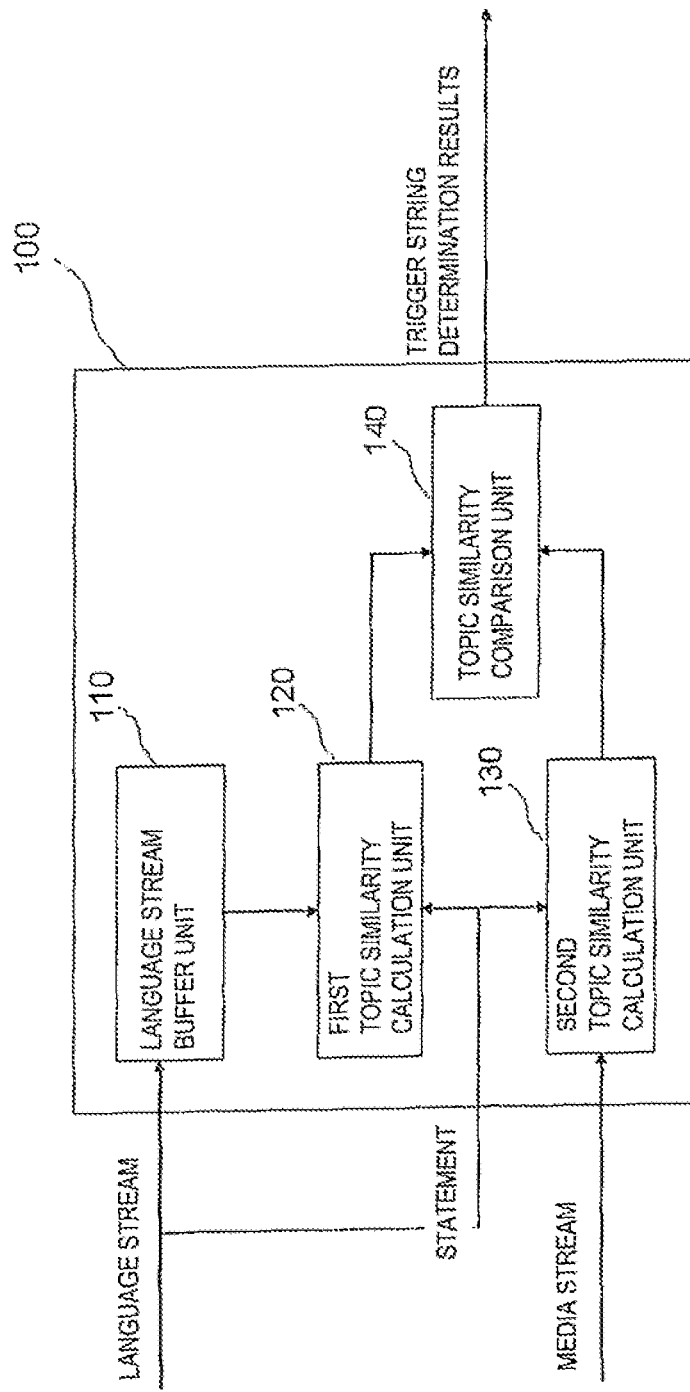
FIG. 1 is a block diagram illustrating a configuration of a topic transition analysis system according to a first exemplary embodiment of the present invention.

FIG. 1 is a block diagram illustrating a configuration of a topic transition analysis system according to a first exemplary embodiment of the present invention. Referring to FIG. 1, the topic transition analysis system according to the first exemplary embodiment of the present invention includes a statement trigger string determination unit 100.

The statement trigger string determination unit 100 includes: a language stream buffer unit 110 temporarily holding each statement included in a language stream; a first topic similarity calculation unit 120 calculating the topic similarity between a statement on which trigger string determination is carried out and each statement held in the language stream buffer unit 110; a second topic similarity calculation unit 130 calculating the topic similarity between the statement on which the trigger string determination is carried out and a media stream; and a topic similarity comparison unit 140.

A program can cause a computer configuring the topic transition analysis system to execute these units. Each of the unit roughly operates as follows.

The language stream buffer unit 110 temporarily accumulates statements included in an inputted language stream in a memory. The statements refer to a series of language events made based on some intention. For example, if the communication on a language stream is an exchange of messages, a single statement corresponds to a single message. If the language stream is a speech, a single sentence corresponds to a statement. Each statement has information about the time of creation thereof.

The first topic similarity calculation unit 120 calculates the topic similarity between an inputted statement and a past statement on the language stream held in the language stream buffer unit 110, based on a given algorithm. In practice, the first topic similarity calculation unit 120 extracts a recent statement accumulated in the language stream buffer unit 110 based on a topic similarity calculation algorithm and calculates the similarity.

The second topic similarity calculation unit 130 calculates the topic similarity between an inputted statement and an arbitrary section on the media stream, based on a given algorithm.

The topic similarity comparison unit 140 compares the topic similarity between the statement and the language stream with the topic similarity between the statement and the media stream, the similarities calculated by the two topic similarity calculation unit, respectively. Next, the topic similarity comparison unit 140 determines the stream exhibiting the higher topic similarity to be the string that has triggered the statement. Next, the topic similarity comparison unit 140 outputs the determination results.

Next, the operation according to the present exemplary embodiment will be described in detail. First, when a language stream is inputted to the language stream buffer unit 110, each statement included in the language stream is extracted and accumulated in the memory included in the language stream buffer unit 110.

If the topic transition analysis system according to the present exemplary embodiment is executed on the language stream online, the trigger string determination is repeated sequentially on the statements continuously appearing on the language stream. In this case, if the trigger string determination is carried out on a statement s1 at a time t1, this statement becomes part of the language stream that is compared when a statement t2 appears at the next time t2. Thus, if the topic transition analysis system is operated in real time, the language stream buffer unit 110 stores the statement s1 when the determination is made for the time t1 (when the first and second topic similarity calculation unit calculate the topic similarity for the statement s1).

The language stream buffer unit 110 may accumulate and store statements temporarily. The number of the statements accumulated at a time is dependent on the algorithm used by the first topic similarity calculation unit 120. For example, if the algorithm requires only one recent statement, it is only necessary that the language stream buffer unit 110 hold one statement. If the required number of statements is N, it is only necessary that the number of statements to be held is N.

The statements accumulated in the language stream buffer unit 110 may be deleted at an appropriate timing. For example, if it is known that the number of statements required by the algorithm is N or less as described above, when the (N+1)th statement appears on the language stream, the oldest statement accumulated may be deleted. Alternatively, if it is known that the memory has a sufficient capacity to store the number of the statements required by the algorithm, when storage of a statement that newly appears on the language stream exceeds this capacity, deletion may be executed. When an algorithm for which such prediction cannot easily be made is used, the first topic similarity calculation unit 120 may instruct the language stream buffer unit 110 to sequentially delete unnecessary statements.

Next, a statement as well as a language stream and a media stream, either of which will be determined to be a string triggering the statement, are supplied to the first and second topic similarity calculation unit.

The first topic similarity calculation unit 120 calculates the topic similarity between the given statement and a statement accumulated in the language stream buffer unit 110, based on a given algorithm.

Various existing methods can be used as a specific calculation technique of the above topic similarity. For example, statements may be regarded as documents and a vector space method (Non-Patent Document 6) may be used. In this case, if a single recent statement on the language stream is used, a biased word vector could be generated. Thus, the sum of word vectors of a plurality of recent statements may be used. Alternatively, multiplication using an attenuation coefficient may be executed to calculate the sum, so that the word vector of a more recent statement has more weight.

Similarly, the second topic similarity calculation unit 130 calculates the topic similarity between the given statement and a media stream, based on a given algorithm.

As in the case of the above first topic similarity calculation unit 120, the second topic similarity calculation unit 130 can use various existing methods to calculate the topic similarity.

Generally, the media stream is often supplied in a mode other than text information. In this case, text information needs to be extracted from the media stream in some way. For example, once information is converted into text data through speech recognition software and the like (Non-Patent Document 7, for example), the topic similarity can be calculated based on a vector space method, as in the case of the first topic similarity. Alternatively, an image recognition technique may be combined to extract character information (telop and the like) in a video stream. Closed caption signals may also be used. In such a way, conversion into text information can be executed. In addition, if a conceptual database including a collection of objects and attributes thereof is available, by executing image recognition on each object in a video and using, for example, the frequency that attributes of the object are included in the statement (red, fruit, delicious, Aomori, and the like for apple, for example), the topic similarity can be defined.

When the second topic similarity calculation unit 130 calculates the topic similarity, there is no need to use the entire media stream inputted up to the calculation time. It is often sufficient to use a section immediately before the time when the target statement is given. For example, a section of a predetermined fixed length may be used. If the stream includes speech signals, a section in which the number of detected speeches is equal to or less than a certain threshold may be used.

Control of the length of a media stream section used to calculate the topic similarity affects appropriate calculation of the topic similarity between the section and the statement. If the section length is excessively long, topic-related characteristics do not clearly show. As a result, an appropriate topic similarity cannot be obtained. On the other hand, if the section is excessively short, information relating to the topic (vocabulary characteristic of the topic) used as a basis for calculation of the topic similarity cannot be observed sufficiently. In this case, an appropriate topic similarity cannot be obtained, either.

Further, if a section on the media stream that has led to a known statement is clear, it is preferable that the topic similarity calculation be executed only on this section and the sections thereafter. This is because that there is a relatively high topic similarity between the topic in this single section and a topic of the statements that have originated from the single section. Namely, the topic similarity between the statement inputted to the second topic similarity calculation unit 130 and these sections exhibits a similar value, increasing difficulty of the determination.

After each of the first and second topic similarity calculation unit calculates the topic similarity between the statement and the corresponding stream, the topic similarity comparison unit 140 compares these topic similarities and determines the stream exhibiting the highest similarity to be the stream that has triggered the statement.

If the topic similarity has been calculated by using the sum of word vectors of a plurality of recent statements and the topic similarity comparison unit 140 has selected a media stream as a string triggering a statement, all the statements accumulated in the language stream buffer unit 110 are deleted. Instead, the statement is newly accumulated in the language stream buffer unit 110. In this way, the trigger string determination on the statement at the next time can be executed properly.

Next, meritorious effects of the present exemplary embodiment will be described. According to the present exemplary embodiment, when determining whether a certain statement is made as a continuous language communication that leads to the recent statement on the language stream or is made as a new language communication based on the recent contents on the media stream, the topic transition analysis system uses only one statement or a plurality of statements immediately before the certain statement and one media stream section near the time when the statement is made. Thus, the determination method is efficient and suitable for online processing.

One reason is that, to determine a media stream position that leads to a certain statement, it is simply necessary to supply the certain statement, one or a plurality of statements immediately before the certain statement, and part of the media stream temporally closest to the certain statement. For example, there is no need to analyze the entire primary or secondary channel to calculate the topic transition. Such feature is derived from the insight that the language communication on the secondary channel is made either as a new response to the primary media stream or as continuation of the communication on the secondary channel.

Another reason is that, when the determination is executed on a certain statement, since the system does not need information corresponding to certain time periods from either stream, the time periods unnecessarily older than the time when the statement is made, the system can be implemented with a minimum storage device.

Second Exemplary Embodiment

Figure 2:
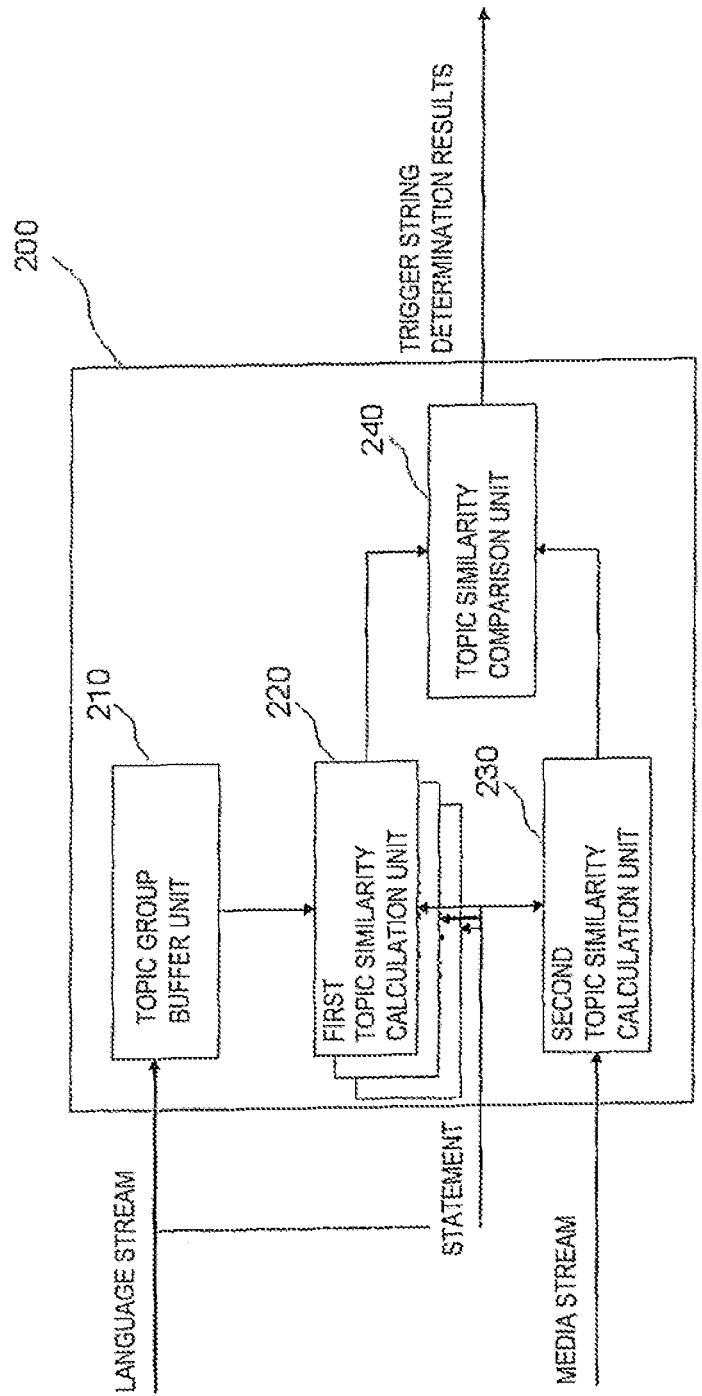
FIG. 2 is a block diagram illustrating a configuration of a topic transition analysis system according to a second exemplary embodiment of the present invention.

Next, a second exemplary embodiment of the present invention will be described in detail with reference to the drawings. FIG. 2 is a block diagram illustrating a configuration of a topic transition analysis system according to the second exemplary embodiment of the present invention. Referring to FIG. 2, the topic transition analysis system according to the second exemplary embodiment of the present invention includes a statement trigger string determination unit 200.

The statement trigger string determination unit 200 includes: a topic group buffer unit 210 temporarily holding each statement included in a language stream according to topic group; a first topic similarity calculation unit 220 calculating the topic similarity between a statement on which trigger string determination is carried out and each statement held in the topic group buffer unit 210; a second topic similarity calculation unit 230 calculating the topic similarity between the statement on which the trigger string determination is carried out and a media stream; and a topic similarity comparison unit 240.

A program can cause a computer configuring the topic transition analysis system to execute these unit. Each of the unit roughly operates as follows.

The topic group buffer unit 210 temporarily accumulates statements included in an inputted language stream in a memory according to topic group. The topic group is a collection of statements having similar topic-related characteristics. Since the statement buffer function is approximately the same as that of the language stream buffer unit 110 according to the first exemplary embodiment of the present invention, description thereof will be omitted.

Operations of the first and second topic similarity calculation unit 220 and 230 are also similar to those according to the first exemplary embodiment of the present invention.

However, the first topic similarity calculating the topic similarity between a statement and a language stream operates slightly differently. In the first exemplary embodiment, since there is only one group of statements from the language stream, a statement is compared with this only one group of statements. On the other hand, in the second exemplary embodiment, since there are a plurality of groups of statements from the language stream (namely, topic groups), the topic similarity calculation is executed on each group.

The topic similarity comparison unit 240 compares the topic similarity with respect to each topic group with the topic similarity with respect to the media stream, determines a topic group or a stream having the highest topic similarity to be a string that has triggered the target statement, and outputs the determination results.

If a statement is determined to have been triggered based on any topic group, the statement is accumulated in the topic group buffer unit 210, as one belonging to the topic group.

Next, meritorious effects of the present exemplary embodiment will be described. In the second exemplary embodiment of the present invention, statements on the language stream are divided into a plurality of topic groups, and the topic similarity with respect to each of the groups is calculated. In this way, even if topic groups overlap with each other temporally on the language stream, the topic transition analysis system can operate without problem.

Figure 3:
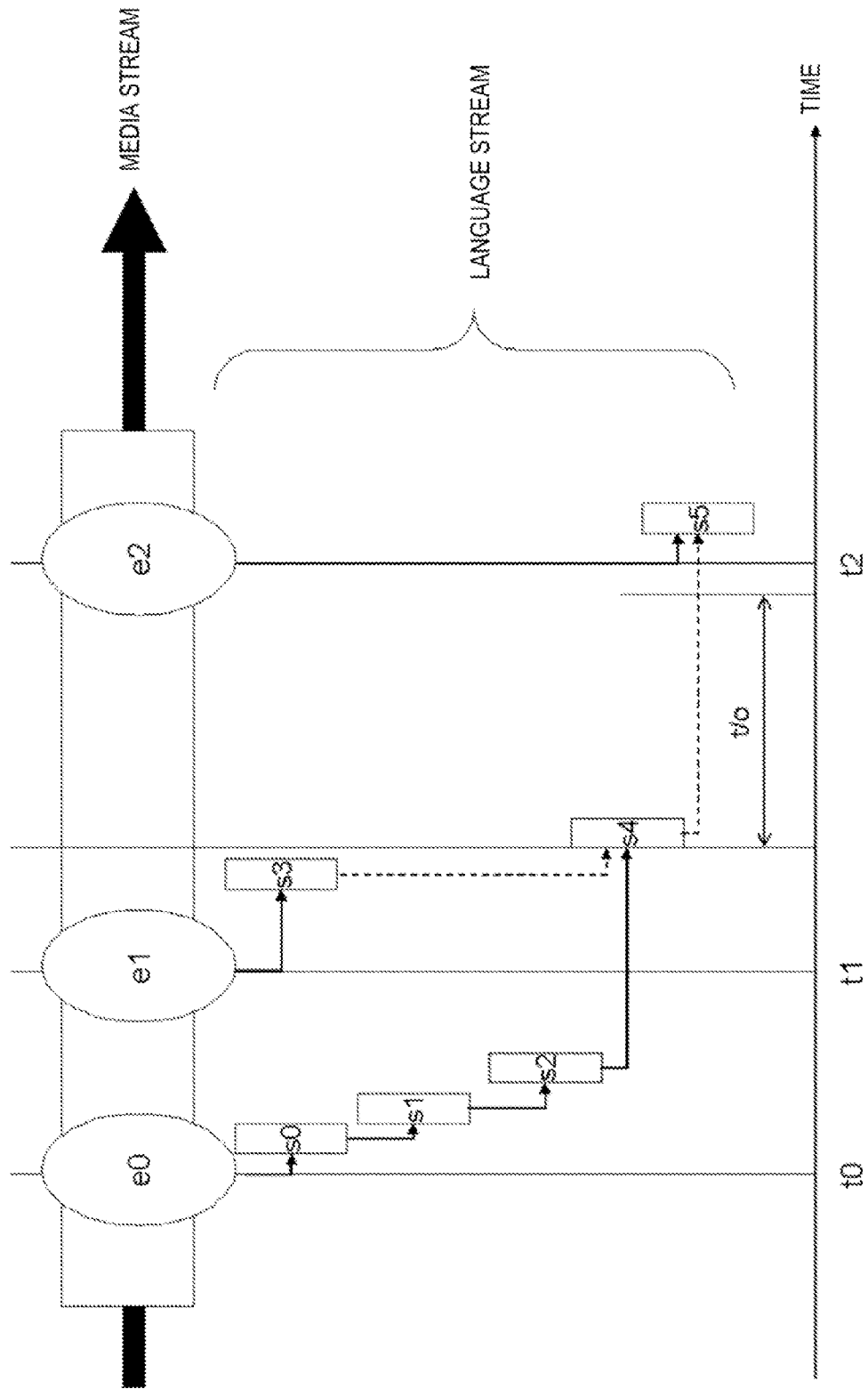
FIG. 3 illustrates an operation of the topic transition analysis system according to the second exemplary embodiment of the present invention.

FIG. 3 illustrates temporally-overlapped statements belonging to a plurality of topic groups. In FIG. 3, an event e0 appears on the media stream around a time t0, and the event e0 leads to a language communication of statements s0, s1, and s2. Next, an event e1 occurs at a time t1 and the event e1 leads to a statement s3. Next, a statement s4 continuous from the statements s0, s1, and s2 is made at a subsequent timing.

If the topic transition analysis system according to the first exemplary embodiment is used, when the statement s3 appears, the statements s0, s1, s2 are deleted from the language stream buffer unit. Thus, instead of properly detecting that the statement s4 belongs to the group including the statements s0, s1, and s2, the topic transition analysis system determines that the statement s4 is continuous from the statement s3 or is related to the media stream immediately after the event e1.

On the other hand, the topic transition analysis system according to the second exemplary embodiment calculates: the topic similarity between the statement s4 and the group including the statements s0, s1, and s2; the topic similarity between the statement s4 and the group including the statement s3; and the topic similarity between the statement s4 and the media stream and compares these similarities. Thus, the topic transition analysis system can properly determine that the statement s4 is continuous from the statements s0, s1, and s2.

By using the topic transition analysis system according to the second exemplary embodiment of the present invention, even if a plurality of temporally-overlapped topic groups appear, a string triggering a statement can be determined properly.

In the topic transition analysis system according to the first exemplary embodiment, the language stream buffer unit 110 deletes old statements from the memory. In the second exemplary embodiment, similar control can be executed. However, no old statements can be deleted at a timing when the media stream is determined to be a trigger string. Thus, an appropriate time-out period (t/o in FIG. 3) needs to be set in advance. The topic transition analysis system simply needs to be designed so that an old statement is deleted at a timing after this time-out period from the time when the last statement belonging to a certain topic group appears. Alternatively, the time-out processing may be started when the topic transition analysis system determines that a certain statement does not belong to any one of the existing topic groups.

For example, in FIG. 3, a statement s5 is made in response to an event e2. However, since the topic similarity between the events e0 and e2 is high, the topic transition analysis system may erroneously determine that the statement s5 belongs to the topic group including the statements s0, s1, s2, and s4. In this case, if the time-out processing is used, when t/o seconds or more elapses from the time t1 at which the statement s4 is made to the time t2 at which the statement s5 is made, the topic transition analysis system can properly determine that the statement s5 is made in response to the event e2.

One reason that this time-out processing is effective is based on the heuristics that, in language communication, after a considerable period of time elapses from when a discussion on another topic is started, a discussion on a previous topic is rarely started suddenly without any trigger or sign.

The same heuristics can also be adopted for the first topic similarity calculation unit 220. Namely, in this case, when calculating the topic similarity with respect to a certain topic group, first, the first topic similarity calculation unit 220 calculates the difference between the time at which the last statement in the topic group is made and the time at which a target statement is made. Next, the first topic similarity calculation unit 220 uses an oblivion coefficient so that, when the difference is larger, the topic similarity is made smaller.

Third Exemplary Embodiment

Figure 4:
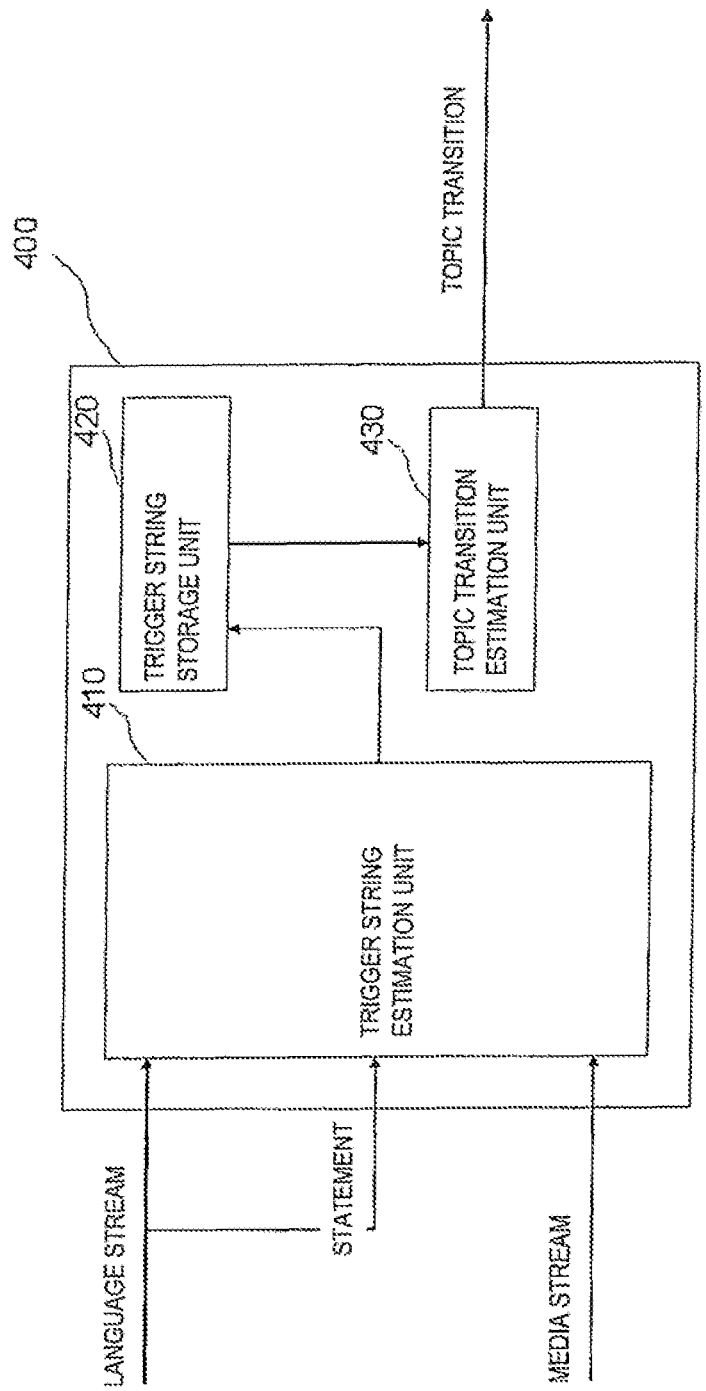
FIG. 4 is a block diagram illustrating a configuration of a topic transition analysis system according to a third exemplary embodiment of the present invention.

Next, a third exemplary embodiment of the present invention will be described in detail with reference to the drawings. FIG. 4 is a block diagram illustrating a configuration of a topic transition analysis system according to the third exemplary embodiment of the present invention. Referring to FIG. 4, the topic transition analysis system according to the third exemplary embodiment of the present invention includes a topic transition network generation unit 400.

The topic transition network generation unit 400 includes a trigger string estimation unit 410, a trigger string storage unit 420, and a topic transition estimation unit 430.

A program can cause a computer configuring the topic transition analysis system to execute these unit. Each of the unit roughly operates as follows.

The trigger string estimation unit 410 is approximately the same as the statement trigger string determination unit 100 and 200 according to the first and second exemplary embodiments. However, while the statement trigger string determination unit 100 and 200 determine a string triggering a certain statement and output results of the determination, the trigger string estimation unit 410 determines the topic similarity of each input stream with respect to a target statement (in the case of a language stream, the topic similarity between a target statement and each topic group) and outputs a set of topic similarities.

The trigger string storage unit 420 stores the set of the topic similarities, that is, the topic similarity between a statement and each stream and the topic similarity between the statement and each topic group obtained by the trigger string estimation unit 410.

The topic transition estimation unit 430 uses a set of topic similarities with respect to each statement accumulated in the trigger string storage unit 420 to establish and output a tree-shaped network representing a relationship among trigger strings of all the statements that appear prior to an arbitrary statement on the language stream. Since this output is a network representing transition of the topic of the language communication on the language stream, the network will be referred to as a topic transition network.

Next, an overall operation according to the present exemplary embodiment will be described in detail with reference to the transition diagram of FIG. 5.

First, the first statement is extracted from the language stream. In this case, the statement appears at a time t0. Since no statement has appeared prior to the statement s0 at the time t0, the topic transition analysis system regards that the statement s0 has been made in response to the recent media stream (box a in FIG. 5). The trigger string storage unit 420 stores the results {s0, m0, g1(s0)}. The results indicate that the statement s0 has formed a new topic group G1 and a section on the media stream whose topic similarity has been calculated with respect to the statement s0 is m0.

Herein, gi(x) represents the topic similarity between a statement x and a topic group Gi.

Next, when a second statement s1 appears at a time t1, the trigger string estimation unit 410 determines whether the second statement s1 has been triggered by contents of a media stream section (box b) around the time t1 or by contents of a recent statement (box c) of the topic group 1 to which the last statement s0 belongs. The trigger string estimation unit 410 calculates the topic similarity between the statement s1 and the media stream and the topic similarity between the statement s1 and the topic group G1. The trigger string storage unit 420 stores the results {s1, m1, g1(s1), g2(s1)}. A topic group G2 is a temporary label given to a topic group newly formed by the statement s1 if the statement s1 is determined to have been triggered by the media stream. The description will be made, assuming that g1(s1)>g2(s1).

Next, when the third statement s2 appears at a time t2, as in the above case, the trigger string estimation unit 410 calculates the topic similarity with respect to each stream and topic group and obtains the results {s2, m2, g1(s2), g2(s2)}. Herein, assuming that g1(s2)<g2(s2), the statement s2 forms a new topic stream G2. Thus, when the fourth statement s3 appears at the next time t3, the topic similarity with respect to a single media stream and the topic similarity with respect to two topic groups are calculated, and as a result, {s3, m3, g1(s3), g2(s3), g3(s3)} is stored in the trigger string storage unit 420. Subsequently, this operation is repeated.

A topic transition network about all the statements that appear until a known statement sn at an arbitrary timing can be generated. To this end, the topic transition estimation unit 430 operates as follows.

First, the topic transition estimation unit 430 extracts the oldest statement s0 from the trigger string storage unit 420 and compares the topic similarity between the statement s0 and each string to which the statement s0 may belong. Since {s0, m0, g1(s0)} is stored for the statement s0, it is determined that the statement s0 belongs to the topic group G1 and has been triggered by contents of a single media stream section m0 around the time t0. Thus, a network including a transition from the single media stream section m0 to the statement s0 is established.

Next, the second oldest statement s1 is extracted. Since {s1, m1, g1(s1), g2(s1)} and g1(s1)>g2(s1), it is determined that the statement s1 belongs to the topic group G1. As a result, the previously established network is updated to add a transition from the statement s0 to the statement s1.

Next, the statement s2 is extracted. Since {s2, m2, g1(s2), g2(s2)} and g1(s2)<g2(s2), it is determined that the statement s2 belongs to the topic group G2. As a result, the previously established network is updated to add a transition from a media stream section m2 to the statement s2.

Figure 6:
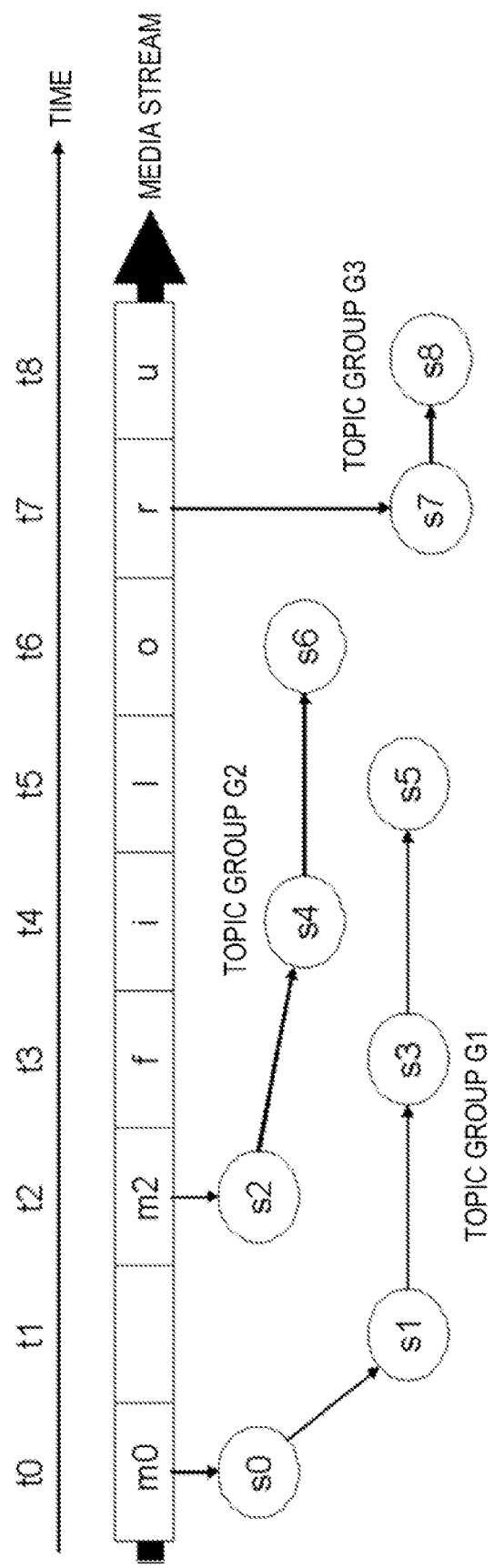
FIG. 6 is an example of a topic transition network (topic transition graph) created by the topic transition analysis system according to the third exemplary embodiment of the present invention.

By repeating this operation, the network as illustrated in FIG. 6 can finally be formed. FIG. 6 illustrates a topic transition network generated at a timing when the topic similarity with respect to a statement s8 is stored in the trigger string storage unit 420.

In the operation that has so far been described, strings, each having the highest topic similarity with respect to a corresponding statement, are determinably selected. Thus, by omitting the trigger string storage unit 420, topic similarity information may directly be inputted from the trigger string estimation unit 410 to the topic transition estimation unit 430 to establish the topic transition network online.

However, there are cases where there is little difference between the strings in terms of the topic similarity with respect to a certain statement. In such case, if a trigger string is determinably determined, an incorrect string may be selected. Thus, in this case, it is effective to process the topic similarity information through the trigger string storage unit 420.

Figure 5:
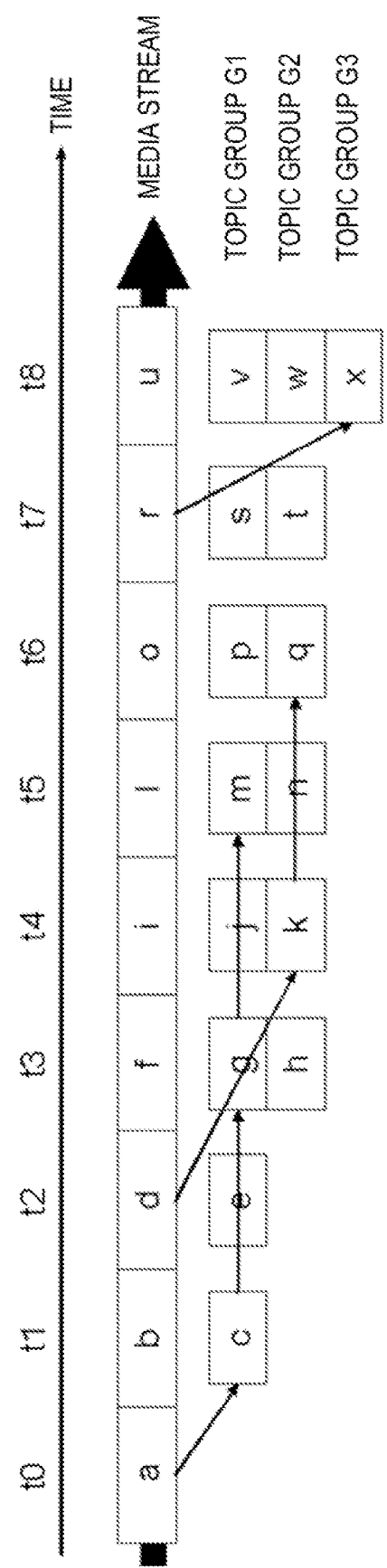
FIG. 5 illustrates an operation of the topic transition analysis system according to the third exemplary embodiment of the present invention.

For example, in FIG. 5, assuming that the difference between the topic similarities g1(s2) and g2(s2) with respect to the statement s2 is very small, if no statement that can be regarded as belonging to the topic group G2 appears after a long period of time, it is highly likely that the classification of the statement s2 into the topic group G2 is originally incorrect. Thus, when a certain statement s is determined to be the first statement of a new topic group G, the topic similarity g(s) with respect to the statement s may be corrected by using a time t until a new statement s' that belongs to (or possibly belongs to) the topic group G appears. More specifically, for example, as represented by the following mathematical expression 1, a penalty may be given after a given time-out period T. In the expression, λ is a positive real number as a given penalty weight.

$$g'(s) = \begin{cases} g(s) - \lambda t, & \text{if } t > T \\ g(s), & \text{if } t \leq t \end{cases}$$ [Mathematical expression 1]

In this way, by accumulating the topic similarity in the trigger string storage unit 420, a more flexible topic transition network can be generated.

Next, meritorious effects of the present exemplary embodiment will be described. In the third exemplary embodiment of the present invention, the topic similarity is used to determine whether a certain statement on the language stream is made as a continuous language communication leading to a statement preceding the certain statement or as a new response to media stream contents preceding the certain statement. Thus, even if the topic in the language communication on the language stream gradually shifts from the original topic at a certain point on the media stream, the topic transition can be tracked.

This is because the present exemplary embodiment uses the following property. That is, in a series of language communications on the language stream originating from a certain point on the media stream, it is estimated that the topic is constant or gradually shifts. However, in a language communication on the language stream newly made in response to contents of the primary media stream, it is estimated that the topic shifts more quickly with the original topic on the media stream than the topic in the series of previous communications.

In addition, the present exemplary embodiment is configured to realize the above meritorious effects simply by giving a certain statement, one or a plurality of statements immediately before the certain statement, and speech recognition results of a media stream section closest to the statement. Thus, a topic transition analysis suitable for online processing can be executed. When online performance is particularly important, the trigger string storage unit 420 may be omitted and the topic transition estimation unit 430 may be operated online. In this way, the topic transition analysis system can be operated completely online.

Fourth Exemplary Embodiment

Figure 7:
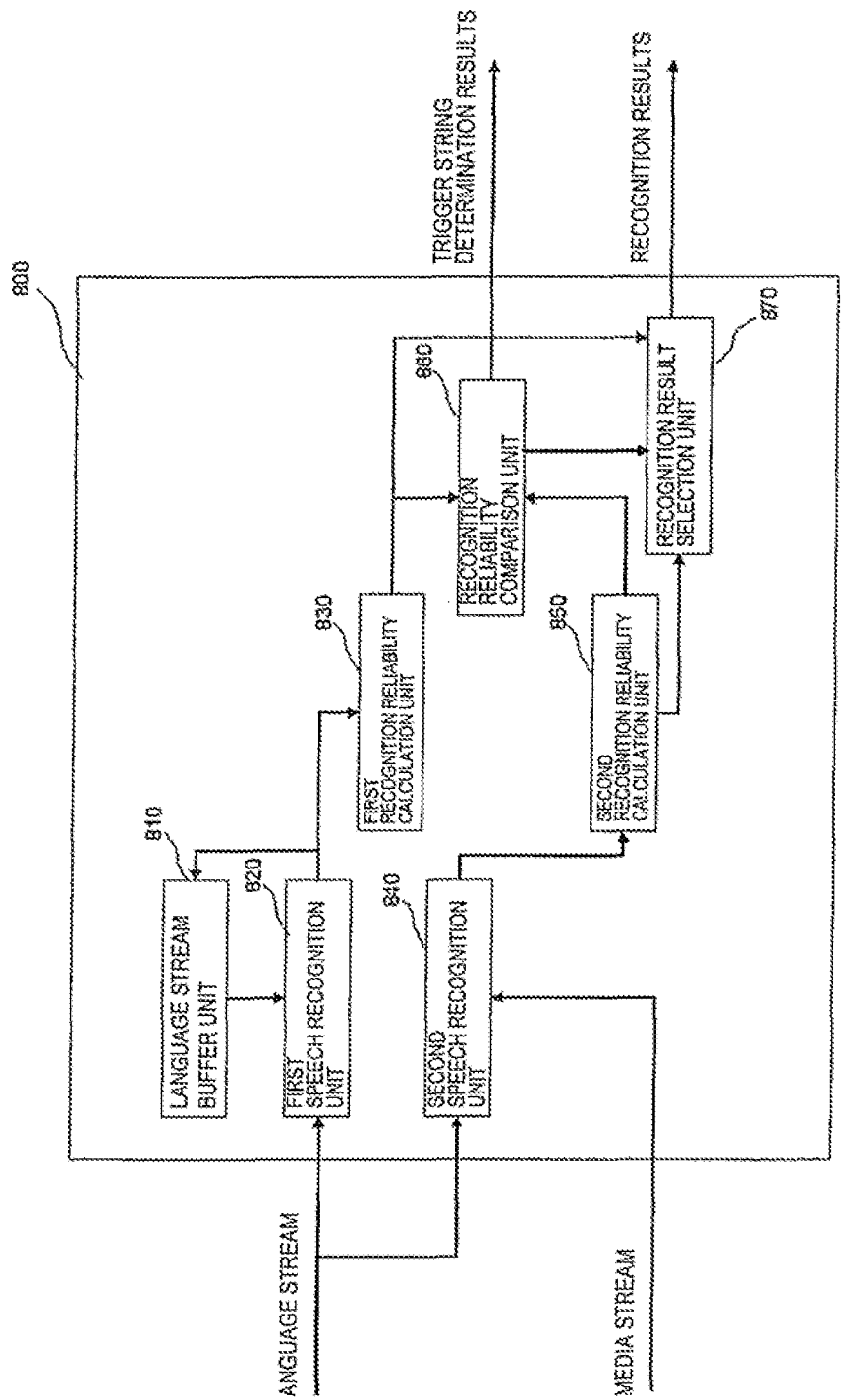
FIG. 7 is a block diagram illustrating a configuration of a topic transition analysis system according to a fourth exemplary embodiment of the present invention.

Next, a fourth exemplary embodiment of the present invention will be described in detail with reference to a drawing. FIG. 7 is a block diagram illustrating a configuration of a topic transition analysis system according to the fourth exemplary embodiment of the present invention.

Referring to FIG. 7, the topic transition analysis system according to the fourth exemplary embodiment of the present invention includes a trigger string determination unit 800.

The trigger string determination unit 800 includes a language stream buffer unit 810, a first speech recognition unit 820, a first recognition reliability calculation unit 830, a second speech recognition unit 840, a second recognition reliability calculation unit 850, a recognition reliability comparison unit 860, and a recognition result selection unit 870.

A program can cause a computer configuring the topic transition analysis system to execute these unit. Each of the unit roughly operates as follows.

The first and second speech recognition unit 820 and 840 use existing speech recognition techniques to convert each speech signal included in an inputted language stream into text. When executing speech recognition, each of the speech recognition unit executes an adaptation process on a different topic.

Examples of a specific method of the topic adaptation speech recognition include various methods. For example, widely-used speech recognition techniques based on a trigger model (Non-Patent Document 8) or a cache model (Non-Patent Document 9) can be used.

The language stream buffer unit 810 accumulates speech recognition results outputted from the first speech recognition unit 820. Recognition result text of one speech is accumulated as a single statement.

For processing (deletion timing, for example) of the statements accumulated in the language stream buffer unit 810, a mode according to the first and second exemplary embodiments can suitably be adopted.

The first speech recognition unit 820 first executes topic adaptation on a collection of recent statements accumulated in the language stream buffer unit 810 and next executes a speech recognition process. Thus, recognition results are slightly biased toward the recent language stream contents.

On the other hand, the second speech recognition unit 840 first executes topic adaptation on a recent single section on the media stream and next executes a speech recognition process. Regarding a specific method of extracting topic information from the media stream, a mode according to that described in the first exemplary embodiment can suitably be adopted.

After extracting some topic information from the media stream, the second speech recognition unit 840 can execute a topic adaptation speech recognition process based on the information. As a result, recognition results outputted from the second speech recognition unit are slightly biased toward the recent media stream contents.

The recognition results outputted from the first and second speech recognition unit 820 and 840 are inputted to the first and second recognition reliability calculation unit 830 and 850, respectively, each of which outputs an index value representing reliability (validity) of the recognition results.

Various types of reliability can be used (Non-Patent Document 10). For example, word posterior probability or the like may be used.

The recognition reliability comparison unit 860 uses the reliabilities outputted from these recognition reliability calculation unit 830 and 850 as the topic similarities with respect to the recent statement on the language stream to determine a trigger string, as in the case of the first and second exemplary embodiments. When the trigger string is determined, the recognition result selection unit 870 outputs the outputted recognition results adapted for the stream determined to be the trigger string, as the recognition result text of the statement.

Next, meritorious effects of the present exemplary embodiment will be described. In the fourth exemplary embodiment of the present invention, when the language stream is given as a media signal including a speech signal, the topic transition analysis system assumes that a certain speech has the same topic as that of the previous language stream contents and that of the recent media stream contents. The topic transition analysis system uses topic-adapted speech recognition unit to convert the speech into text. Depending on the reliability level of the text obtained as conversion results, the topic transition analysis system determines which of the stream contents triggers the certain statement. Thus, even when the language stream is not in text format, a trigger string can be determined.

This is because the topic of the speech is closer to that of one of the streams. Thus, the recognition results adapted for the closer stream topic are better than the other recognition results.

In addition, another meritorious effect according to the present exemplary embodiment of the present invention is that, when the language stream is given as a media signal including a speech signal, a better recognition result text of the speech signal of the language stream can simultaneously be obtained. This is because, since the certain speech topic is the same as that of either the language-stream or media-stream contents immediately before the certain speech, it can be expected that recognition results adapted for the topic are more suitable than recognition results that are not adapted for any topic.

In the above first to fourth exemplary embodiments, only one language stream is used. However, even if two or more language streams are used, the above operations and effects can of course be obtained based on similar principles.

Fifth Exemplary Embodiment

Figure 8:
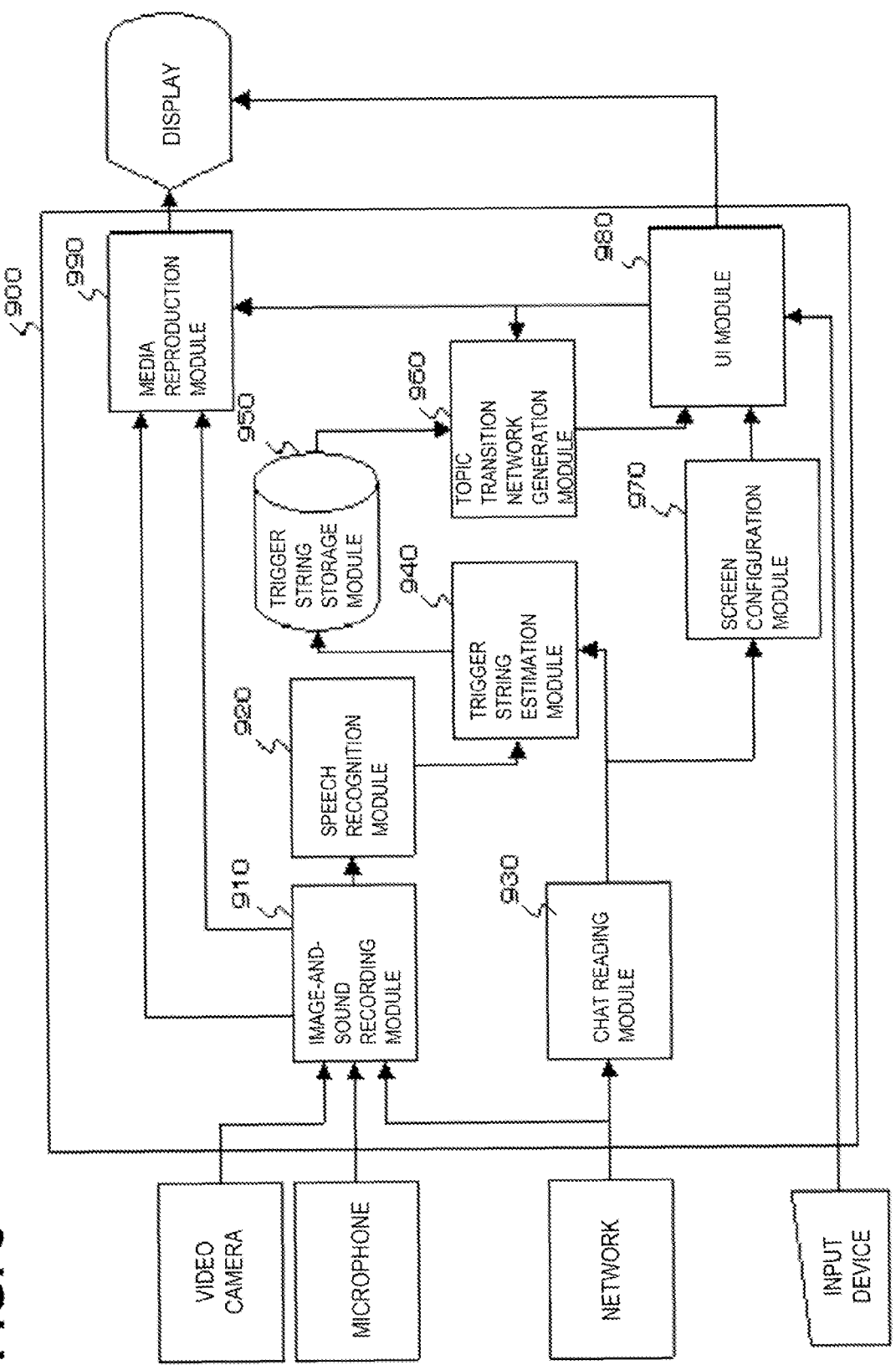
FIG. 8 is a block diagram illustrating a configuration of a real-time meeting support apparatus according to a fifth exemplary embodiment of the present invention.

Next, a fifth exemplary embodiment, which is an application of the present invention to a real-time meeting support apparatus, will be described in detail with reference to a drawing. FIG. 8 is a block diagram illustrating a configuration of a real-time meeting support apparatus according to the fifth exemplary embodiment of the present invention.

As illustrated in FIG. 8, the real-time meeting support apparatus according to the present exemplary embodiment includes a computer 900, a video camera, a microphone, a display device, and an input device, all of which are connected to the computer 900. The computer 900 is connected to a network.

The computer 900 includes the following software modules. Namely, the computer 900 includes: an image-and-sound recording module 910 capturing speech and video; a speech recognition module 920 converting speech into text; a chat reading module 930 sequentially capturing statements (messages) written by a computer chat from the network; a trigger string estimation module 940; a trigger string storage module 950; a topic transition network generation module 960; a screen configuration module 970 appropriately forming information such as a chat statement and a video and arranging the information along with UI (User Interface) elements such as hyperlinks and buttons; a UI module 980 outputting an image based on the arrangement information and receiving corresponding UI operations; and a media reproduction module 990 reproducing video or speech at an arbitrary time based on the arrangement made by the screen configuration module 970.

These modules roughly operate as follows.

The image-and-sound recording module 910 captures video and speech signals inputted through a video camera and a microphone, respectively, based on a predetermined method. The image-and-sound recording module 910 may capture a video/speech stream via a network. The speech signal is sent to the speech recognition module 920 (in the case of a video signal, the speech signal is extracted from the video signal). The video and speech signals are buffered as needed and are sent to the media reproduction module 990 for reproduction.

The speech recognition module 920 is a specific example of the speech recognition unit according to the above first to fourth exemplary embodiments. The speech recognition module 920 generates a text string having the highest validity with respect to the inputted speech signal and sends the text string to the trigger string estimation module 940 along with time information.

In the present exemplary embodiment, spoken language speeches exchanged at a meeting are assumed. Thus, it is desirable that a speech recognition module implementing a spontaneous speech recognition technique such as one disclosed in Non-Patent Document 11 be used.

The chat reading module 930 sequentially captures statements newly appearing through a computer chat executed via a network and sends the statements to the trigger string estimation module 940 along with time information.

In the computer chat, some time information is given to each message. Some rule for the synchronization between the time information and the video or the speech inputted to the image-and-sound recording module 910 needs to be known. In the present exemplary embodiment, real-time meeting support, that is, a chat carried out in parallel with a meeting chat, is assumed. Thus, it is simply necessary to acquire time stamps each corresponding to a chat message.

The trigger string estimation module 940 is a specific example of the trigger string estimation unit according to the third exemplary embodiment. Namely, the trigger string estimation module 940 receives the speech recognition result text obtained from the speech recognition module 920 and the chat message text obtained from the chat reading module 930 and temporarily accumulates these texts as needed. Upon receiving a new chat message text from the chat reading module 930, the trigger string estimation module 940 estimates a string that has triggered the message text and sends the string and an estimation result score to the trigger string storage module 950.

More specifically, the real-time meeting support apparatus operates as follows. Candidates of the string triggering a chat statement s(t) inputted at a certain time t include topic groups g1, g2, ..., gn-1 and a video-signal or speech-signal string. If the statement s(t) has been made by the video-signal or speech-signal string, a new topic group gn is formed. Consequently, n topic groups will be regarded as candidates of the trigger string. For each of the candidates, the topic similarity between the statement s(t) and one or a plurality of statements immediately before the statement s(t) is calculated. As the gn (speech recognition result string), recognition result texts r(u1), r(u2), ..., r(um) obtained from one or a plurality of speech sections that appear a given delay time D or more before the time t are used (assuming that the sections start at u1, u2, ..., um, respectively). This delay time D is a minimum delay time required for chat input and network transmission and is set to be approximately one second, for example.

Certain chat systems have an automatic determination function. With this function, if a statement is made in a specific format, it is automatically determined that the statement has been triggered by another specific statement. Even without such function, there are cases where chat users acknowledge as a common understanding that certain formats have similar effects. In these cases, a trigger string of a certain statement may be determined based on a format of the certain statement. In this case, the topic similarity is determinably given (a maximum value to a certain topic group and minimum values to all the other strings).

The trigger string storage module 950 is a specific example of the above trigger string storage unit according to the third exemplary embodiment. The trigger string storage module 950 accumulates groups of the chat statement texts obtained from the chat reading module 930, the trigger strings of the statements, and the scores of the trigger strings in a memory or an external storage device. Further, in response to a request from the topic transition network generation module 960, the trigger string storage module 950 supplies a collection of groups of arbitrary statement trigger strings and scores.

Based on the above description, accumulated data will be described more specifically. The trigger string storage module 950 stores {t, s(t), d(g1, s(t)), d(g2, s(t)), ..., d(gn, s(t)), u1, u2, ..., um} as a set. The d(x, y) represents the topic similarity between a string x and a statement y.

In accordance with instructions from the UI module 980, the topic transition network generation module 960 generates a topic transition network (topic transition graph) based on the information accumulated in the trigger string storage module 950. This operation has already been described in detail in the third exemplary embodiment. The generated topic transition network is used by the UI module 980.

Before the real-time meeting support system according to the present exemplary embodiment displays useful information, such as the individual chat statements acquired by the chat reading module 930 and a display area on which video or speech is reproduced by the media reproduction module 990, on the screen to users, the screen configuration module 970 appropriately adds hyperlinks, button controls, and the like to the information. Namely, the screen configuration module 970 determines the screen arrangement and outputs screen configuration information.

For example, when the screen arrangement is written in HTML (Hyper Text Markup Language), the screen configuration module generates HTML documents. The screen configuration module enables users to execute interaction about individual statements with buttons or hyperlinks. The screen configuration module embeds a scroll bar or a frame structure so that the users can read the information easily. In addition, the screen configuration module 970 executes a layout calculation to ensure a display area in which controls for video or speech reproduction executed by the media reproduction module 990 are arranged.

As in a general chat system, the individual chat statements may be arranged simply chronologically. Alternatively, the chat statements may be displayed in the form of a tree for each transition string (see FIG. 6). However, in this case, when the screen configuration module 970 updates the screen configuration information, a topic transition network needs to be acquired from the topic transition network generation module 960. Alternatively, an overlay display (caption, see Non-Patent Document 2) in accordance with the display contents of the media reproduction module 990 may be executed. Alternatively, the statements may be arranged in the form of balloons chronologically for the reproduced video or speech. When coordination with the media reproduction module is executed in such a manner, information necessary for the coordination is also included in the screen configuration information, and the combined information is then outputted.

The UI module 980 executes a screen rendering process based on the screen arrangement information generated by the screen configuration module 970, and the display device displays the results to the users. In addition, the UI module 980 receives user input from the input device such as a mouse or a keyboard and controls the system as follows.

Upon receiving an action as the user input that specifies a statement embedded in the screen arrangement information (a specific example of this action is a click on a hyperlink or a button control), the UI module 980 causes the topic transition network generation module 960 to generate a topic transition network including the statement, determines the appearance time of the video or speech leading to this statement, and controls the media reproduction module 990 to reproduce the video or speech around the appearance time. Simply put, this is a cue function using chat statements as an index.

Specifically, the process for determining the appearance time of the video or speech leading to a statement is executed as follows. In a network generated by the topic transition network generation module 960, the statement corresponds to a node in the network. By tracking the network toward the starting node thereof from this node, a statement can eventually be traced. If the appearance time of this statement s(t') is a time t', the appearance time of the video or speech leading to the statement s(t') can be determined. For example, a time prior to the time t' by a certain time (1 second, 5 seconds, or 10 seconds, for example) may be selected. Alternatively, the start time of the speech section detected temporally immediately before the time t' may be used. Still alternatively, a time u'1 of the oldest statement used when a string triggering the statement s(t') made at the time t' is estimated may be used. Of course, these conditions may be combined to make the determination.

Upon receiving a user input instructing the media reproduction module 990 to reproduce the video or speech at a certain time (for example, a time-shift operation through a scroll bar), the UI module 980 causes the topic transition network generation module 960 to generate a topic transition network and determines whether a topic transition string (=topic group) leading to the video or speech around the certain time exists. If the UI module 980 determines that any one of the topic groups (a plurality of topic groups may be included) originates around the time, the topic group is reflected and displayed on the screen. More specifically, the statements belonging to the topic group are displayed in a color different from that of the other statements. Alternatively, the text size may be increased. Alternatively, the display may be switched to the recent statements belonging to the topic group. The latter is convenient when examining a response to a certain video or speech scene.

Preferred exemplary embodiments and specific examples thereof of the present invention have thus been described. However, the present invention is not limited to the above exemplary embodiments or specific examples thereof. Further variations, substitutions, or modifications may be made within the scope of the basic technical concept of the present invention.

INDUSTRIAL APPLICABILITY

Besides the above real-time meeting support apparatus, the present invention can also be applied to other media stream indexing systems or language stream search systems. For example, the present invention can be applied to a meeting/lecture support system that sparks active discussions through a secondary communication at a meeting, a lecture, or the like where the primary purpose is creation of ideas. In addition, the present invention can preferably be applied to the media stream indexing system or the language stream search system for academic conference presentations or for the purpose of education.

Further, the present invention can also be applied to a video communication support system that activates communication using a video as a medium. The term "means" used in the disclosure of the present invention signifies a unit having functions relevant thereto. In the following, preferred modes are summarized.

Mode 1

(Refer to the Information Processing System of the First Aspect)

Mode 2

The topic transition analysis system according to mode 1, wherein the statement trigger string determination unit executes the determination based on a higher one of a similarity between the statement and media stream contents at and around the time when the statement is made and a similarity between the statement and language stream contents prior to the time when the statement is made.

Mode 3

The topic transition analysis system according to mode 1 or 2 comprising:

one or a plurality of topic similarity calculation unit calculating a topic similarity between the statement and a media stream at and around the time when the statement is made and a topic similarity between the statement and a group of statements made immediately before the statement, wherein the statement trigger string determination unit determines a string having a higher topic similarity to be a string that has triggered the statement.

Mode 4

The topic transition analysis system according to mode 3, wherein at least one of the topic similarity calculation unit receives the statement and one or a plurality of statement groups which are similarity calculation targets, calculates document vectors with respect to the statement and the statement groups by adding weight to each term included in the statement and the statement groups based on a given algorithm, calculating distances among these document vectors, and calculating topic similarities based on the distances.

Mode 5

The topic transition analysis system according to mode 3 or 4, further comprising:

a speech recognition unit generating a text string from a speech signal included in the primary media stream, wherein at least one of the topic similarity calculation unit calculates a topic similarity between the statement and a text string generated by the speech recognition unit from the entire section or an arbitrary section of the media stream which is a similarity calculation target.

Mode 6

The topic transition analysis system according to any one of modes 3 to 5, further comprising:

a topic group storage unit classifying a plurality of statements appearing on the language stream into topic groups according to topic similarity and storing the plurality of statements according to the topic groups, wherein the topic similarity calculation unit calculates a topic similarity between the statement and each of the groups accumulated in the topic group storage unit, and wherein the statement trigger string determination unit determines a string having a higher topic similarity to be a string that has triggered the statement.

Mode 7

The topic transition analysis system according to any one of modes 3 to 6, further comprising:

a speech recognition unit generating a text string adapted for an arbitrary topic from a speech signal included in the language stream; and a speech recognition result reliability estimation unit estimating validity of a text string generated by the speech recognition unit, wherein, when the speech recognition unit generates a text string from a speech signal, which is a speech of the statement, of a language stream section, at least one of the topic similarity calculation unit executes a speech recognition process adapted for a topic estimated from the entire section or an arbitrary section of the media stream and one or a plurality of statement groups, which are similarity calculation targets, and calculates a topic similarity based on reliability indices obtained after the speech recognition result reliability estimation unit estimates validity on the text strings obtained by the speech recognition process.

Mode 8

The topic transition analysis system according to mode 5 or 7 outputting speech recognition results of a string that is determined to have a higher topic similarity by the statement trigger string determination unit.

Mode 9

The topic transition analysis system according to any one of modes 3 to 8, further comprising:

a topic transition network generation unit generating, based on the topic similarity, a topic transition network in which arbitrary points or sections of the media stream and individual statement trigger strings are represented in the form of a tree-shaped network.

Mode 10

A media stream indexing system comprising:

the topic transition analysis system according to any one of modes 1 to 9; and a unit estimating a point or section on the media stream triggering an arbitrary statement on the language stream.

Mode 11

A language stream search system comprising:

the topic transition analysis system according to any one of modes 1 to 9; and a unit estimating a statement string on the language stream originating from an arbitrary point or section on the media stream.

Mode 12

(Refer to the Topic Transition Analysis Method of the Second Aspect)

Mode 13

The topic transition analysis method according to mode 12, wherein the determination is executed based on a higher one of a similarity between the statement and media stream contents at and around the time when the statement is made and a similarity between the statement and language stream contents prior to the time when the statement is made.

Mode 14

(Refer to the Computer Program of the Third Aspect)

Mode 15

The computer program according to mode 14 determining whether or not the statement has been made newly in response to contents of the media stream, based on a higher one of a similarity between the statement and media stream contents at and around the time when the statement is made and a similarity between the statement and language stream contents prior to the time when the statement is made.

Modifications and adjustments of the exemplary embodiments and examples are possible within the scope of the overall disclosure (including claims) of the present invention and based on the basic technical concept of the invention. Various combinations and selections of various disclosed elements are possible within the scope of the claims of the present invention. That is, the present invention of course includes various variations and modifications that could be made by those skilled in the art according to the overall disclosure including the claims and the technical concept.

What is claimed is:

1. A topic transition analysis system comprising:
a statement trigger string determination unit receiving a primary media stream and one or a plurality of language communication streams (hereinafter, language streams) executed in parallel with the media stream and determining whether or not a certain statement on the one or plurality of language streams has been made newly in response to contents of the media stream,
wherein the statement trigger string determination unit executes the determination based on a higher one of a similarity between the statement and media stream contents at and around the time when the statement is made and a similarity between the statement and language stream contents prior to the time when the statement is made.

2. A media stream indexing system comprising:
the topic transition analysis system according to claim 1; and
a unit estimating a point or section on the media stream triggering an arbitrary statement on the language stream.

3. A language stream search system comprising:
the topic transition analysis system according to claim 1; and
a unit estimating a statement string on the language stream originating from an arbitrary point or section on the media stream.

4. The topic transition analysis system according to claim 1 comprising:
at least one of topic similarity calculation unit calculating a topic similarity between the statement and a media stream at and around the time when the statement is made and a topic similarity between the statement and a group of statements made immediately before the statement,
wherein the statement trigger string determination unit determines a string having a higher topic similarity to be a string that has triggered the statement.

5. The topic transition analysis system according to claim 4,
wherein said at least one of the topic similarity calculation unit receives the statement and one or a plurality of statement groups which are similarity calculation targets, calculates document vectors with respect to the statement and the statement groups by adding weight to each term included in the statement and the statement groups based on a given algorithm, calculating distances among these document vectors, and calculating topic similarities based on the distances.

6. The topic transition analysis system according to claim 5, further comprising:
a speech recognition unit generating a text string from a speech signal included in the primary media stream,
wherein said at least one of the topic similarity calculation unit calculates a topic similarity between the statement and a text string generated by the speech recognition unit from the entire section or an arbitrary section of the media stream which is a similarity calculation target.

7. The topic transition analysis system according to claim 4, further comprising:
a speech recognition unit generating a text string from a speech signal included in the primary media stream,
wherein said at least one of the topic similarity calculation unit calculates a topic similarity between the statement and a text string generated by the speech recognition unit from the entire section or an arbitrary section of the media stream which is a similarity calculation target.

8. A topic transition analysis system comprising:
a statement trigger string determination unit receiving a primary media stream and one or a plurality of language communication streams (hereinafter, language streams) executed in parallel with the media stream and determining whether or not a certain statement on the one or plurality of language streams has been made newly in response to contents of the media stream; and
one or a plurality of topic similarity calculation unit calculating a topic similarity between the statement and a media stream at and around the time when the statement is made and a topic similarity between the statement and a group of statements made immediately before the statement,
wherein the statement trigger string determination unit determines a string having a higher topic similarity to be a string that has triggered the statement.

9. The topic transition analysis system according to claim 8,
wherein at least one of the topic similarity calculation unit receives the statement and one or a plurality of statement groups which are similarity calculation targets, calculates document vectors with respect to the statement and the statement groups by adding weight to each term included in the statement and the statement groups based on a given algorithm, calculating distances among these document vectors, and calculating topic similarities based on the distances.

10. The topic transition analysis system according to claim 9, further comprising:
a speech recognition unit generating a text string from a speech signal included in the primary media stream,
wherein said at least one of the topic similarity calculation unit calculates a topic similarity between the statement and a text string generated by the speech recognition unit from the entire section or an arbitrary section of the media stream which is a similarity calculation target.

11. The topic transition analysis system according to claim 8, further comprising:
a speech recognition unit generating a text string from a speech signal included in the primary media stream,
wherein at least one of the topic similarity calculation unit calculates a topic similarity between the statement and a text string generated by the speech recognition unit from the entire section or an arbitrary section of the media stream which is a similarity calculation target.

12. The topic transition analysis system according to claim 11 outputting speech recognition results of a string that is determined to have a higher topic similarity by the statement trigger string determination unit.

13. The topic transition analysis system according to claim 8, further comprising:
a topic group storage unit classifying a plurality of statements appearing on the language stream into topic groups according to topic similarity and storing the plurality of statements according to the topic groups,
wherein the topic similarity calculation unit calculates a topic similarity between the statement and each of the groups accumulated in the topic group storage unit, and
wherein the statement trigger string determination unit determines a string having a higher topic similarity to be a string that has triggered the statement.

14. The topic transition analysis system according to claim 8, further comprising:
a speech recognition unit generating a text string adapted for an arbitrary topic from a speech signal included in the language stream; and
a speech recognition result reliability estimation unit estimating validity of a text string generated by the speech recognition unit,
wherein, when the speech recognition unit generates a text string from a speech signal, which is a speech of the statement, of a language stream section, at least one of the topic similarity calculation unit executes a speech recognition process adapted for a topic estimated from the entire section or an arbitrary section of the media stream and one or a plurality of statement groups, which are similarity calculation targets, and calculates a topic similarity based on reliability indices obtained after the speech recognition result reliability estimation unit estimates validity on the text strings obtained by the speech recognition process.

15. The topic transition analysis system according to claim 8, further comprising:
a topic transition network generation unit generating, based on the topic similarity, a topic transition network in which arbitrary points or sections of the media stream and individual statement trigger strings are represented in the form of a tree-shaped network.

16. A topic transition analysis method comprising:
selecting, by a computer, an arbitrary statement from one or a plurality of language communication streams (hereinafter, language streams) executed in parallel with a media stream; and
determining, by the computer, whether or not the statement has been made newly in response to contents of the media stream,
wherein the determination is executed based on a higher one of a similarity between the statement and media stream contents at and around the time when the statement is made and a similarity between the statement and language stream contents prior to the time when the statement is made.

17. A non-transitory computer-readable data storage medium storing a program causing a computer configuring a topic transition analysis system to execute the processes of:
selecting an arbitrary statement from one or a plurality of language communication streams (hereinafter, language streams) executed in parallel with a media stream; and
determining whether or not the statement has been made newly in response to contents of the media stream,
wherein determining whether or not the statement has been made newly in response to contents of the media stream is based on a higher one of a similarity between the statement and media stream contents at and around the time when the statement is made and a similarity between the statement and language stream contents prior to the time when the statement is made.

* * * * *